United States Patent
Guo et al.

(10) Patent No.: US 9,998,212 B2
(45) Date of Patent: Jun. 12, 2018

(54) METHOD, SYSTEM AND NODE FOR IMPLEMENTING AUTOMATIC PROTECTION SWITCHING IN OPTICAL BURST-SWITCHING RING

(71) Applicant: ZTE Corporation, Shenzhen (CN)

(72) Inventors: Hongxiang Guo, Shenzhen (CN); Dongxu Zhang, Shenzhen (CN); Xue Chen, Shenzhen (CN); Jian Wu, Shenzhen (CN); Gaofeng An, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 5 days.

(21) Appl. No.: 14/905,849

(22) PCT Filed: Jun. 19, 2014

(86) PCT No.: PCT/CN2014/080349
§ 371 (c)(1),
(2) Date: Jan. 18, 2016

(87) PCT Pub. No.: WO2015/007134
PCT Pub. Date: Jan. 22, 2015

(65) Prior Publication Data
US 2016/0156410 A1    Jun. 2, 2016

(30) Foreign Application Priority Data
Jul. 16, 2013    (CN) .......................... 2013 1 0298344

(51) Int. Cl.
*G02F 1/00* (2006.01)
*H04J 14/00* (2006.01)
(Continued)

(52) U.S. Cl.
CPC ..... *H04B 10/032* (2013.01); *H04B 10/07955* (2013.01); *H04B 10/275* (2013.01);
(Continued)

(58) Field of Classification Search
USPC ........................................ 398/2, 45, 59, 83
See application file for complete search history.

(56) References Cited

U.S. PATENT DOCUMENTS 6,147,967 A * 11/2000 Ying .................. G06F 11/2242
                                                          370/222
7,088,679 B2 * 8/2006 Behzadi ............... H04L 12/437
                                                          370/230
(Continued)

FOREIGN PATENT DOCUMENTS

CN        1719944 A      1/2006
CN      101013990 A      8/2007
(Continued)

OTHER PUBLICATIONS

International Search Report for corresponding application PCT/CN2014/080349 filed Jun. 19, 2014; dated Sep. 19, 2014.
(Continued)

*Primary Examiner* — David Payne
*Assistant Examiner* — Pranesh Barua
(74) *Attorney, Agent, or Firm* — Cantor Colburn LLP

(57) ABSTRACT

Provided are a method, a system and a node for implementing APS in an OBRing network. The method comprises: a master node and a slave node separately perform optical power monitoring on respective channels, and aggregate monitoring results to the master node; when determining, according to the monitoring results, that a fault occurs, the master node sends a switching operation instruction to the slave node; and the slave node performs a switching operation and enters a protection working state. With the disclo-
(Continued)

sure, a protection switching mechanism is introduced to the OBRing, which implements the processing on fault and ensures the communication quality of the OBRing.

14 Claims, 3 Drawing Sheets

(51) Int. Cl.
| | |
|---|---|
| H04B 10/20 | (2006.01) |
| H04B 10/032 | (2013.01) |
| H04B 10/079 | (2013.01) |
| H04B 10/275 | (2013.01) |
| H04Q 11/00 | (2006.01) |
| H04L 12/437 | (2006.01) |
| H04L 12/24 | (2006.01) |

(52) U.S. Cl.
CPC ........ *H04L 12/437* (2013.01); *H04L 41/0668* (2013.01); *H04Q 11/0066* (2013.01); *H04Q 2011/0081* (2013.01); *H04Q 2011/0092* (2013.01)

(56) References Cited

U.S. PATENT DOCUMENTS

| | | | | |
|---|---|---|---|---|
| 7,609,966 | B2* | 10/2009 | Gumaste | H04J 14/0227 370/352 |
| 8,509,617 | B2* | 8/2013 | Cao | H04J 3/0658 398/47 |
| 2001/0038472 | A1 | 11/2001 | Lee et al. | |
| 2002/0071149 | A1* | 6/2002 | Xu | H04B 10/032 398/5 |
| 2003/0185564 | A1* | 10/2003 | Hayashi | H04Q 11/0062 398/33 |
| 2004/0057453 | A1* | 3/2004 | Montgomery, Jr. | H04J 3/085 370/452 |
| 2004/0071468 | A1* | 4/2004 | Doh | H04Q 11/0066 398/59 |
| 2004/0153529 | A1* | 8/2004 | Rikitake | H04J 3/14 709/220 |
| 2004/0208172 | A1* | 10/2004 | Ovadia | H04Q 11/0066 370/360 |
| 2004/0208552 | A1* | 10/2004 | Harney | H04Q 11/0005 398/51 |
| 2004/0213572 | A1* | 10/2004 | Doh | H04Q 11/0066 398/59 |
| 2004/0228631 | A1* | 11/2004 | Mantin | H04J 14/0204 398/83 |
| 2004/0240884 | A1* | 12/2004 | Gumaste | H04J 14/0204 398/59 |
| 2005/0286896 | A1* | 12/2005 | Kinoshita | H04J 14/0204 398/83 |
| 2006/0140625 | A1* | 6/2006 | Ooi | H04B 10/032 398/19 |
| 2006/0188251 | A1* | 8/2006 | Chan | H04J 14/0283 398/4 |
| 2006/0275035 | A1* | 12/2006 | Way | H04B 10/27 398/59 |
| 2007/0237189 | A1* | 10/2007 | Miguel | H04J 3/0682 398/118 |
| 2008/0107416 | A1* | 5/2008 | Wang | H04L 12/437 398/59 |
| 2009/0022489 | A1* | 1/2009 | Way | H04J 14/0204 398/4 |
| 2009/0269053 | A1* | 10/2009 | Yang | H04B 10/0791 398/22 |
| 2010/0260040 | A1* | 10/2010 | Wu | H04L 12/437 370/223 |
| 2011/0026411 | A1* | 2/2011 | Hao | H04L 12/40189 370/249 |
| 2011/0097090 | A1* | 4/2011 | Cao | H04J 3/0658 398/154 |
| 2011/0222396 | A1* | 9/2011 | Tochio | H04L 12/437 370/222 |
| 2011/0255860 | A1* | 10/2011 | Lee | G01M 11/3136 398/12 |
| 2012/0275781 | A1* | 11/2012 | McDonald | H04J 14/0283 398/25 |
| 2012/0315037 | A1* | 12/2012 | Smith | H04L 45/02 398/45 |
| 2013/0243417 | A1* | 9/2013 | Youn | H04B 10/032 398/5 |
| 2013/0294229 | A1* | 11/2013 | Togo | H04J 3/14 370/228 |
| 2014/0010536 | A1* | 1/2014 | Shields | H04L 45/04 398/51 |
| 2014/0093232 | A1* | 4/2014 | Hood | H04B 10/032 398/5 |
| 2015/0222385 | A1* | 8/2015 | Ponzini | H04J 14/0295 398/83 |

FOREIGN PATENT DOCUMENTS

| | | | | |
|---|---|---|---|---|
| CN | 101043267 A | | 9/2007 | |
| CN | 101895367 A | | 11/2010 | |
| CN | 101959083 A | | 1/2011 | |
| EP | 1998503 A1 | * | 12/2008 | .......... H04J 14/0283 |
| EP | 2339783 A1 | * | 6/2011 | ............. H04L 12/26 |
| JP | 2013511181 A | | 3/2013 | |

OTHER PUBLICATIONS

European Search Report for corresponding application EP 14 82 6446; Report dated Jun. 28, 2016.

Saurav Das et al, "Protection and Spatial Reuse in Optical Burst Transport (OBT) Networks", Broadband Communications Networks and Systems, Oct. 5, 2006, pp. 1-10.

* cited by examiner

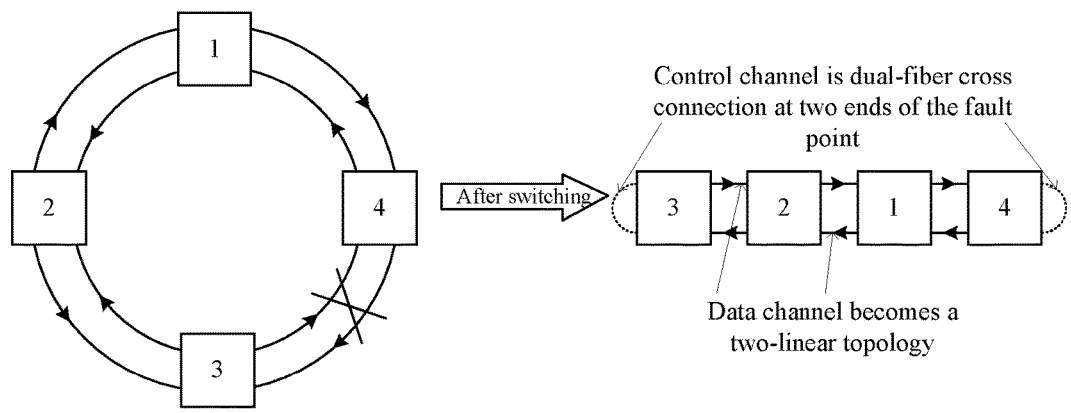
Fig. 3
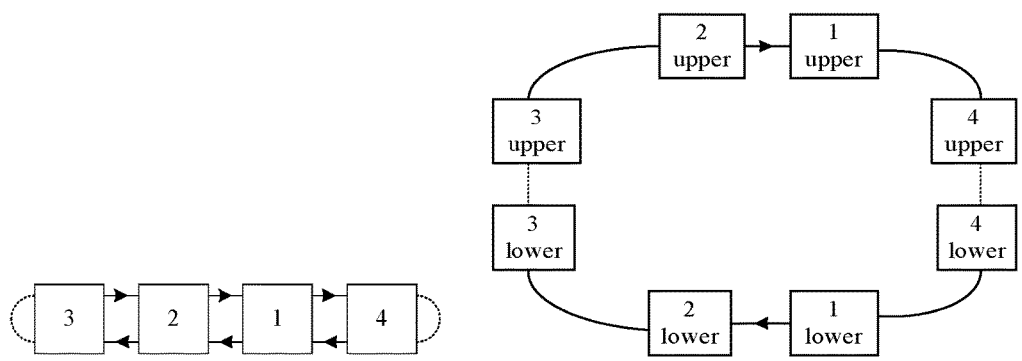
Fig. 4(a)                    Fig. 4(b)

METHOD, SYSTEM AND NODE FOR IMPLEMENTING AUTOMATIC PROTECTION SWITCHING IN OPTICAL BURST-SWITCHING RING

TECHNICAL FIELD

The disclosure relates to a network protection technology, and in particular to a method, a system and a node for implementing Automatic Protection Switching (APS) in a centrally-controlled Optical Burst-switching Ring (OBRing).

BACKGROUND

With the growing development of Internet, particularly, with the rise of the number of users, the increasing demand on bandwidth and the popularization of cloud service mode, it is more difficult for the traditional Metro convergence network to handle the requirements demanded by services on bandwidth, such as high flexibility, high reliability and low power consumption. Under this condition, OBRing, as an all-optical networking technology capable of providing sub-wavelength switching granularity, receives extensive attention and study. As shown in FIG. 1, OBRing generally can adopt a two-fibre self-healing ring form that is commonly used in a ring networking technology, and can support APS. The fibre channels of the OBRing are divided into a control channel and a data channel, in which the control channel is configured to transfer signalling on a control plane and to realize dynamic bandwidth allocation, management and configuration, and the like. The core of the OBRing lies in providing granularity based on the sub-wavelength bandwidth of an OB packet and all-optical switching capability, while bandwidth allocation and resource scheduling, protection switching and service recovery are two key technologies of the OBRing control plane. The protection switching and service recovery technology are the basis for improving network survivability and ensuring network availability.

The inherent feature of the ring topology enables a network to automatically enter a protection mode through a protection switching operation when the network encounters a failure, and tries to provide maximum available bandwidth by making use of remaining network connectivity and minimize the service interruption time until the network recovers to the normal working state after the fault repair.

If the Metro optical network is to employ the ring network protection switching, there are some examples in existing technical schemes: the Synchronous Digital Hierarchy (SDH) ring technology employs a self-healing ring technology, which includes two-fibre unidirectional (bidirectional) MS protection rings, two-fibre unidirectional (bidirectional) shared channel protection rings and the like, of which the basic principle is to network using two fibres or more fibres, make redundant resources as a reserved protection channel to form a 1:1 or N:1 protection; the resilient packet ring standards regulate some protection switching schemes such as wrapping mode, steering mode and cut-through mode; further, the Optical Transport Network (OTN), Packet Transport Network (PTN) and other networks have their own protection switching mechanisms. However, the above technical schemes are designed for respective network architecture, none of which can be directly available to the OBRing. From the view of technology, in the existing ring protection switching technical schemes, basic network design is that a node can perform photoelectric conversion on both services and control signals; however, in the OBRing only the control channel can perform photoelectric conversion, data service can pass through nodes transparently only, besides uplink and downlink; therefore, any protection switching method to schedule services in an electrical domain cannot be directly applied to the OBRing.

In the existing ring network technologies supporting protection switching, resilient packet ring is most close to the OBRing network model. In the steering mode protection switching of the resilient packet ring, a default node can perform photoelectrical conversion of services by default, thus switching scheduling is simple, however this protection switching mode still cannot be directly applied to the OBRing network, particularly for the centrally-controlled OBRing; the control information of bandwidth allocation needs a path to traverse all nodes one time and finally to return to the master node; however, the traditional steering mode based on distributed control does not take this condition into consideration. Actually, the cut-through mode is designed for the node capable of performing photoelectrical conversion too, this node can be crossed directly in the electrical domain in the case of electrical domain processing fault, thereby ensuring the remaining nodes in the network to continue working; however, in the OBRing the node itself supports the transparent pass-through of services, and only the control channel performs photoelectrical conversion; thus, the cut-through mode makes little sense to the OBRing. Wrapping mode, similar to the two-fibre unidirectional MS protection technology in SDH, completes conversion in the electrical domain only, which not only supports the photoelectrical optical network, but also supports all-optical networking technology; however, existing technical schemes related to the wrapping component still are not improved against the feature of the centrally-controlled OBRing; moreover, the wrapping mode in the all-optical switching OBRing will cause the transceiver on the spare fibre to enter a protection mode and thus to stop data transceiving, thereby leading to resource waste; therefore, the wrapping mode is not an optimized scheme in view of service recovery.

At present, there is no solution for protection switching and service recovery in the centrally-controlled OBRing all-optical switching network capable of providing sub-wavelength switching granularity.

SUMMARY

The embodiment of the disclosure provides a method, a system and a node for implementing APS in an OBRing network, which can introduce a protection switching mechanism to the OBRing, implement fault processing and recovery and ensure the communication quality of the OBRing.

To resolve the above technical problem, the embodiment of the disclosure provides a method for implementing APS in an OBRing, including: a master node and a slave node separately perform optical power monitoring on respective channels, and aggregate monitoring results to the master node;

when determining according to the monitoring results that a fault occurs, the master node sends a switching operation instruction to the slave node; and the slave node performs a switching operation and enters a protection working state.

Optical power monitoring includes real-time monitoring of optical power states on a control channel and a data channel.

Aggregating the monitoring results to the master node includes:

the slave node transmits the monitoring result carried in a control frame or a new fault report message to the master node through the control channel;

the monitoring result of the master node includes a real-time monitoring result that the master node monitors the optical power states of the control channel and the data channel and the monitoring result reported by each slave node through the control channel.

Determining according to the monitoring results that the fault occurs includes:

when the monitoring results show that there is only one ring having a node reporting optical loss on both control channel and data channel, determining that the fault is a single-fibre single-point line fault;

when the monitoring results show that there are two rings respectively having a node (adjacent to each other) reporting optical loss on both control channel and data channel, determining that the fault is a double-fibre single-point line fault;

when the monitoring results show that there is only one node reporting optical loss on the control channel, determining that the fault is a control channel transmitter fault;

when the monitoring results show that both rings have an exception in receiving of control frames, determining that the fault is a non-master node paralysis.

When the fault indicates that there is a wavelength fault in data channel which does not affect the operation of the entire network, the method further includes:

the master node notifies related nodes to avoid the data channel with the unavailable wavelength, and reports the condition to a network management system.

The method might further include: each slave node feeds back to the master node a control frame indicating a successful switching operation;

or, feeds back a fault report response message indicating a successful switching operation corresponding to the fault report message.

If the master node is located at one end of the fault point, the method might further include:

the master node itself performs a switching operation, specifically, triggers a protection switch to enter a protection state;

otherwise, the master node directly enters the protection working state.

Before the slave node performs the switching operation, the method might further include: after the slave node receives a switching operation instruction, the slave node judges whether itself is one of the nodes located at two ends of the fault point;

if not, the slave node directly enters the protection working state and waits the master node to reallocate bandwidth;

otherwise, the slave node triggers the protection switch to enter the protection working state according to the switching operation instruction.

Triggering protection switch includes: switching an optical switch from a bar state in a normal working state to a cross state; or, scheduling the control channel from one ring to another ring in an electrical domain.

After entering the protection working state, the method might further includes: all transceivers of the master node and each slave node share one control channel;

each node is split into an upper node and a lower node logically, which correspond to the transceivers on the original inner ring and outer ring respectively, wherein the upper node extracts from a control frame the bandwidth configuration information of an upper link and performs OB transceiving according to the bandwidth configuration information of the upper link, and the lower node extracts, from a control frame, bandwidth configuration information of a lower link and performs OB transceiving according to the bandwidth configuration information of the lower link.

The master node is divided into an upper master node and a lower master node logically and the method might further include:

when the control frame flows through the upper master node, all bandwidth request information of the lower link is aggregated to the upper master node, and the upper master node calculates a corresponding bandwidth configuration policy according to a bandwidth allocation algorithm and fills the corresponding bandwidth configuration policy into a control frame; when the control frame flows through a first node on the lower link, the carried bandwidth allocation policy of the lower link begin to take effect;

correspondingly, when the control frame flows through the lower master node, all bandwidth requests of the upper node are submitted and a corresponding bandwidth allocation policy of the upper link is updated according to the bandwidth allocation algorithm.

The method might further include: the master node ranges and fine tunes the ring length according to the ranging result.

The method might further include: recovering normal transmission of services on the master node and each slave node.

After the fault is recovered, the method might further include: the network transmits an instruction through the network management system, to notify the master node and each slave node to enter the normal dual-ring working state from the protection working state.

Entering to the normal dual-ring working state includes:

after the master node receives the instruction from the network management system, the master node sends a control frame carrying a network recovery indication on the control channel, wherein the control frame is processed and forwarded at all approached nodes;

the approached nodes suspend all services and wait a new restart, meanwhile, when the nodes at two ends of the fault section terminates service transmission, the optical switch is switched from the cross state to the bar state in which is the normal working state, or, the cross-ring forwarding of the control channel in an electrical domain is stopped, and the normal working state is recovered.

After the master node sends the control frame carrying a network recovery indication, the method might further include: the master node enables a new turn of ranging, bandwidth allocation and restart immediately or after receiving a response indicating waiting from the slave node.

The embodiment of the disclosure further provides a node, which is applied to an OBRing of a two-fibre reverse ring network, including: a control channel processing component, a data channel receiving component, a data channel sending component and a protection switch, wherein the control channel processing component includes:

a first power monitoring component, which is configured to detect an optical signal power state of a control channel and to output a control frame to a control frame parsing component after performing photoelectrical conversion;

a control frame parsing component, which is configured to: parse the control frame, transmit a corresponding instruction to the data channel receiving component and the data channel sending component according to the bandwidth reservation information indicated in the control frame, transmit a data frame on an upper link and a lower link normally, and notify a control frame generation component to generate a new control frame according to a processing condition of the current node;

a control frame generation component, which is configured to: receive a notification from the control frame parsing component or a fault notification from the data channel receiving component, generate a new control frame according to the notification, and send the new control frame to a control frame sending component;

a control frame sending component, which is configured to send the new control frame sent from the control frame generation component to a fibre line to transmit to a downstream node;

the data channel receiving component includes:

a second power monitoring component, which is configured to monitor each wavelength and to notify the monitoring result to the control frame generation component via a control interface;

a quick selection switch configured to receive, via the control interface, the control frame sent from the control channel processing component, and to receive, according to the bandwidth reservation information contained in the control frame, an OB signal transmitted on the lower link, wherein the received OB optical signal is sent to a user end after photoelectrical conversion and local electrical domain cache.

If the control frame received by the node is to indicate the node to perform a protection switching operation, the control frame parsing component is further configured to notify the protection switch to perform a switching action after finishing parsing the control frame.

The node is a master node and might further include a fault judgement component and a bandwidth allocation component, wherein the fault judgement component is configured to: collect monitoring results on the node, acquire optical power monitoring results of other nodes in a network from the information, which is parsed from a control frame in the control channel processing component by the control frame parsing component, determine, according to the monitoring results, whether there is a fault in the network, and a fault type and a fault location, and output the obtained fault result to the control frame generation component in the control channel processing component;

the control frame generation component in the control channel processing component is further configured to: receive a bandwidth allocation result from the bandwidth allocation component and convert the bandwidth allocation result to corresponding control frame data, receive a fault result from the fault judgement component, generate corresponding signalling information according to the fault result and filling the signalling information into a new control frame, and send the new control frame to the control frame sending component.

The embodiment of the disclosure further provides a system for implementing APS in an OBRing network, which is an OBRing network of a two-fibre reverse ring network;

in the OBRing network, a control channel occupies a physical channel individually; nodes in the OBRing network comprises a master node and a plurality of slave nodes;

each of the nodes comprises a control channel processing component, a data channel receiving component, a data channel sending component and a protection switch.

when one of the nodes is a master node, the system further comprises a fault judgement component and a bandwidth allocation component.

The technical scheme provided by the embodiment includes: a master node and a slave node separately perform optical power monitoring on respective channels, and aggregate monitoring results to the master node; when determining, according to the monitoring results, that a fault occurs, the master node sends a switching operation instruction to the slave node; and the slave node (related nodes at two ends of the fault) performs a switching operation and enters a protection working state. With the embodiment of the disclosure, a protection switching mechanism is introduced to the OBRing, which implements the processing on fault and ensures the communication quality of the OBRing.

Further, the method provided by the embodiment of the disclosure, by employing different switching operations on the data channel and the control channel, that is, switching the data channel to a dual-bus topology from a dual-ring topology and switching the original dual-ring control channel to a big single ring, not only meets the protection requirement demanded by the OBRing on a control channel ring, ensures that the control channel can still work in a master-slave ring working mode, but also considers the utilization of a transceiver on the data channel and brings the availability of the transceiver on each node into full play.

BRIEF DESCRIPTION OF THE DRAWINGS

Accompanying drawings described hereinafter, which are employed to further illustrate the disclosure, constitute one part of the application. The exemplary embodiments of the disclosure and the description thereof are used to explain the disclosure but to limit the disclosure improperly. In the accompanying drawings:

FIG. 3 is a diagram of a protection switching action according to an embodiment of the disclosure;

FIG. 4 (a) is a diagram of a network after protection switching in the embodiment shown in FIG. 5 according to an embodiment of the disclosure;

FIG. 4 (b) is an equivalent network diagram of the network diagram in the embodiment shown in FIG. 5 according to an embodiment of the disclosure;

DETAILED DESCRIPTION OF THE EMBODIMENTS

Figure 2:
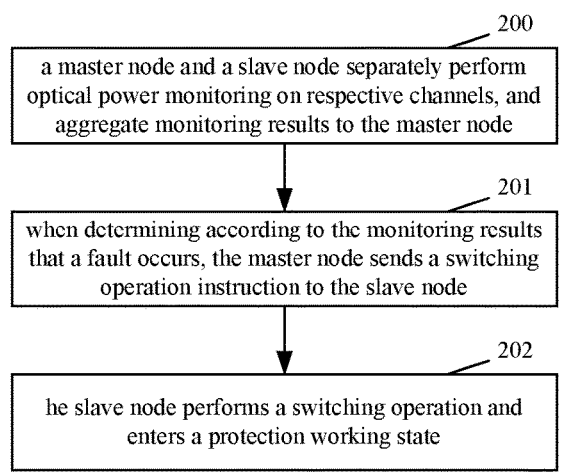
FIG. 2 is a flowchart of a method for implementing APS in an OBRing network according to an embodiment of the disclosure.

FIG. 2 is a flowchart of a method for implementing APS in an OBRing according to an embodiment the disclosure; the method as shown in FIG. 2 includes the following blocks.

In block 200, a master node and each slave node separately perform optical power monitoring on respective channels, and aggregate monitoring results to the master node.

In this block, the master node and each slave node both perform real-time monitoring of optical power states (also called optical path states) on a control channel and a data channel respectively. The monitoring result of the optical path state monitored by the slave node may be carried in a control frame or a new fault report message, which is transmitted to the master node through the control channel; the monitoring result of the optical path state on the master node includes a real-time monitoring result of the optical power states monitored on the control channel and the data channel by the master node itself and the monitoring result reported by each slave node through the control channel.

In block 201, when determining, according to the monitoring results, that a fault occurs, the master node sends a switching operation instruction to the each slave node respectively.

The OBRing network to which the method provided by the embodiment of the disclosure is applicable is a two-fibre reverse network. In this block, the fault the master node may determine mainly refers to the control channel and data channel fibre ring interruption caused by single-fibre break or dual-fibre break. In this block, the fault, determined according to the monitoring results, capable of directly leading to a network operation failure might include: when the monitoring results show that there is only one ring having a node reporting optical loss on both control channel and data channel, the fault is a single-fibre single-point line fault; when the monitoring results show that there are two rings respectively having a node (adjacent to each other) reporting optical loss on both control channel and data channel, the fault is a double-fibre single-point line fault; when the monitoring results show that there is only one node reporting optical loss on the control channel, the fault is a control channel transmitter fault; when the monitoring results show that both rings have an exception in receiving of control frames, the fault is a non-master node paralysis (for example, power supply failure). In the occurrence of these faults, the master node sends a switching operation instruction to the each slave node.

In addition, it should be noted that if it is determined according to the monitoring results that there is a data channel with a wavelength fault which does not affect the operation of the entire network, it is not necessary to perform the protection switching operation described in the embodiment of the disclosure; the master node only needs to notify related nodes to avoid the unavailable wavelength channel, and report the condition to a network management system. Of course, the master node also can send a switching operation instruction to the slave node in this condition.

In block 202, the slave node performs a switching operation and enters a protection working state.

Before this block, the method might further include: the master node transmits to the each slave node a control frame containing a switching operation instruction; each slave node the control frame passes through compares the consistency between the node ID carried in the control frame and the ID of the current slave node, so as to determine whether the current slave node is one of the nodes located at two ends of the fault (that is, the fault end node); if inconsistent, it indicated that the current slave node is not a fault node, the slave node directly enters a protection working state and continues to forward the control frame downstream, waiting the master node to reallocate bandwidth; if consistent, it is indicated that the current slave node is a fault end node, then the slave node performs a corresponding switching operation according to the switching instruction. If the slave node adopts an optical switch as a protection switch, at this time the slave node only needs to switch the protection switch to the cross state from the bar state in which is the normal working state, so as to merge the control channels of the inner ring and outer ring; if the slave node does not adopt an optical switch, it is simply needed to schedule, in the electrical domain, the control channel signal originally towards the fault point to the direction of another ring directly, that is, the originally independent inner and outer ring are merged into a big ring. As shown in FIG. 3, supposing node 1 is a master node, the fault is the fibre break between slave node 3 and slave node 4; after protection switching, as shown in FIG. 4 (a) and FIG. 4 (b), the two originally independent ring networks form a dual-linear network; at this time, the network logically may be viewed as a new network having 2N nodes totally (the original network has N nodes), and the new network has two linear data channels and share one ring control channel.

After finishing the above process, each node of the network automatically enters the protection working state, that is, the protection mode, the original dual-ring dual-control channel network is transformed into a network in which the master node and each slave node in the protection states share one control channel. At this time, the transceiving work of all nodes has no difference from that in the normal state, that is, in both protection mode and normal working mode OB transceiving is performed according to the bandwidth configuration information carried in the control frame. The difference lies in that both inner ring and outer ring in the normal working state separately have a ring control channel and each node performs bandwidth allocation on two rings independently; while in the protection working state all nodes have one shared ring control channel only, which is configured to transmit the bandwidth configuration information of the dual-linear network simultaneously.

From FIG. 3, FIG. 4 (a) and FIG. 4 (b), it can be seen that each node may be split into an upper node and a lower node logically, which correspond to the transceiver on the original inner ring and outer ring respectively, wherein the upper node extracts from a control frame the bandwidth configuration information belonging to an upper link and performs OB transceiving according to the bandwidth configuration information, and the lower node extracts from a control frame the bandwidth configuration information belonging to a lower link and performs OB transceiving according to the bandwidth configuration information. In a switched network, the data channel is changed from a reverse dual-ring topology in a normal state to a reverse dual-bus topology in a protection state; meanwhile, the control channel is interconnected at two ends of the two buses, still forming a ring channel. That is to say, it is equivalent that all nodes on two rings in the normal state share one control channel ring in the protection state. Through the protection switching provided by the embodiment of the disclosure, on one hand, it ensures that the control channel may still work in a master-slave ring working mode, and on the other hand brings the availability of the transceiver on each node into full play.

It should be noted that at the master node in the protection working state the bandwidth allocation algorithm is different from that in the normal working mode. In the embodiments shown in FIG. 4 (a) and FIG. 4 (b), master node 1 can be divided into an upper master node 1 (Upper 1 shown in FIG. 4 (a) and FIG. 4 (b)) and a lower master node 1 (Lower 1 shown in FIG. 4 (a) and FIG. 4 (b)), when a control frame flows through the upper master node 1, the bandwidth request information of the lower link all may be aggregated to the master node 1 which then calculates a corresponding bandwidth configuration policy according to the bandwidth allocation algorithm and fills the bandwidth configuration policy into the control frame; when the control frame reaches the first node of the lower link, for example, Lower 4 shown in FIG. 4 (a) and FIG. 4 (b) (slave node 4), the carried bandwidth allocation policy of the lower link takes effect; correspondingly, when the control frame flows through the lower master node 1, all bandwidth requests of the upper nodes will be submitted to the lower master node 1 which then updates the corresponding uplink bandwidth allocation policy according to the bandwidth allocation algorithm.

In block 202, the method further includes: if the master node just is located at one end of the fault point, the master node itself performs a switching operation, specifically, triggers a protection switch to enter a protection state; otherwise, the master node directly enters the protection working state.

In block 202, the method further includes: each slave node feeds back to the master node a control frame indicating a successful switching operation, a fault report response message indicating a successful switching operation in responses to the fault report message.

The method provided in the disclosure introduces a protection switching mechanism to the OBRing network, implements processing on fault and ensures the communication quality of the OBRing network.

The OBRing, of which the physical network is based on a passive optical ring, gets a change in the physical topology of the data channel and the control channel after switching; in order to meet some restraint relationship probably existing between the control frame length/data frame length and the network ring length in the OBRing, the method provided in the embodiment of the disclosure might further include: the master node performs ranging and fine tunes the ring length according to the ranging result so as to enable an integer multiple restraint relationship between the ring length and the frame length. It should be noted that the implementation of ranging and fine tuning of ring length are commonly known for those skilled in the art, and the specific operation thereof is not intended to limit the scope of protection of the disclosure; thus no further description is needed here.

Further, after finishing ranging, that is, fine tuning the ring length, the network may recover the normal transmission of services; at this time, each slave node behaves on the control channel and the data channel the same as in the normal dual-ring working state, with the only difference lying in that the master node needs to allocate bandwidth according to the bandwidth requests sent from two buses respectively and transmit the bandwidth allocation results for the two buses in one same control channel simultaneously.

Further, after fault repair, the method provided by the embodiment of the disclosure might further include: the network notifies, by any possible methods, the nodes to recover to the normal dual-ring working state from the protection working state, for example, transmitting an instruction through the network management system.

Specifically:

after the master node receives an instruction from the network management system, the master node sends a control frame carrying a network recovery indication on the control channel, wherein the control frame is processed and forwarded at all approached nodes; then, the approached nodes suspend all services and wait a new restart; particularly, while the nodes at two ends of the fault point terminates service transmission after receiving the control frame, the switched locations are re-switched into the original dual-ring working state through the optical switch, that is, the optical switch is switched from the cross state to the bar state which is the normal working state;

after the master node sends the control frame carrying the network recovery indication, the master node enables a new turn of ranging, bandwidth allocation and restart immediately or after receiving a response from the slave node indicating waiting. Then, the network is recovered to the normal dual-ring working state.

The above method provided by the embodiment of the disclosure resolves the problem in the centrally-controlled OBRing network that no proper protection switching mechanism is available, and introduces to the OBRing network a protection switching mechanism, which implements the processing on fault and ensures the communication quality of the OBRing; further, the method provided by the embodiment of the disclosure, by employing different switching operations on a data channel and a control channel, not only meets the protection requirement demanded by the centralized-control OBRing on a control channel ring, ensures that the control channel can still work in a master-slave ring working mode, but also considers the utilization of a transceiver on the data channel, and brings the availability of the transceiver on each node into full play.

Figure 1:
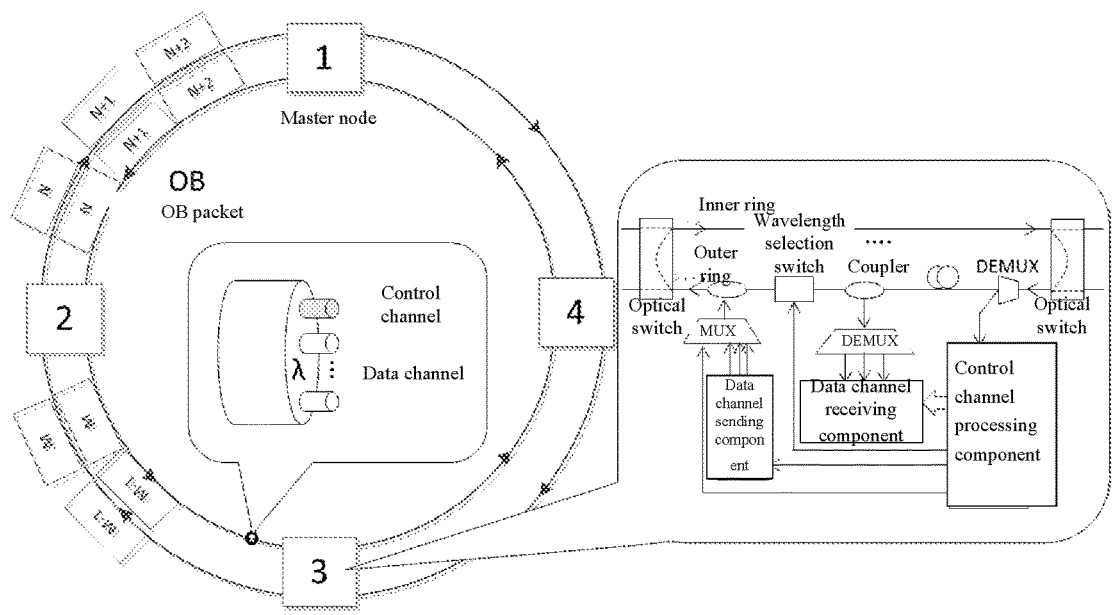
FIG. 1 is a structure diagram of an existing OBRing sub-wavelength switching optical network and nodes thereof.

The method provided by the embodiment of the disclosure is based on the OBRing network shown in FIG. 1; as shown in FIG. 1 the OBRing network at least includes the following functions:

two fibre rings (to form a protection, data flow directions are opposite on the two fibre rings), one of which is for working and the other is for protection: only one fibre ring is employed to transmit and receive services in normal conditions, while the other ring is used for protection; low-priority services might be transmitted and received in the protection ring only;

a control channel occupying a physical channel individually: physical channels are divided out in each fibre according to wavelength resources; the control channel at least occupies one wavelength channel permanently and all control signal clocks are synchronized with the master node;

centralized bandwidth allocation control: when a control frame transmitted in the control channel passes through each node, bandwidth request information of a current is filled into the control frame, thereby aggregating all bandwidth request information to the master node in each ring period. The master node allocates bandwidths in a centralized mode, and fills an allocation result into the control frame which transmits the allocation result to each node in a next ring period;

there is a master-slave relationship among all nodes: the master node holds responsibility for global scheduling, including executing a bandwidth allocation policy, coordinating the transceiving time sequence among all nodes through the control channel, implements dynamic sub-wavelength switching and meanwhile avoiding conflict competition; besides, the master node and the slave node have a consistent physical structure;

each node is provided with the same set of transceivers on both rings, including respective processing components of both control channel and data channel;

OB packets have a fixed length value during the running process of the system, and the ring length is an integer multiple of an OB packet length;

If a single-point fault occurs in the network, no matter a node fault or a break fibre and where the fault is located, the inherent feature of the dual-ring topology enables all nodes to connect with the master node in at least one ring direction; at this time, the transceivers of all nodes must be synchronized with the master node;

From the network structure shown in FIG. 1, there are two fibres passing through each node; while, from the view of the entire network, the structure is divided into an inner ring and an outer ring, on which services flow in opposite directions, similar to ringlet0 and ringlet1 in the resilient packet network. From the inside of each node, the inner ring and the outer ring are mounted with the same function components, with the only difference in service flow direction.

As shown in FIG. 1, for any ring, there is a de-multiplexer (DEMUX) in the node to distinguish the control channel from the data channel, wherein a control signal enters the processing component of the control channel to be logically processed in the electrical domain, while the data channel continues to transmit the signal forwards in the optical domain, subsequently passes through some fibre delay lines and finally passes through a coupler which couples part signal energy to the lower link which transmits the coupled part signal energy to the data channel receiving component. In addition, there is a wavelength selection switch, which, by refereeing to the indication of the control signal, terminates the signal of the control channel and the wavelength signal conflicting with the signal, flowing through the current node, of the upper link. Meanwhile, the control channel processing component is further configured to control the sending component of the data channel to send the local signal of the upper link to a corresponding wavelength and OB timeslot; the control channel processing component is further configured to send the updated control frame and the data frame of the upper link together to the fibre line via a coupler.

An optical switch needs to be provided at the input and output ports at two sides of the node respectively, which is configured to keep the inner ring and the outer ring parallel in the normal network running state and to switch the inner ring and the outer ring to a bridged state when the network enters a protection switching mode. Further, the optical switch might be one capable of selecting a wavelength, so that it can flexibly select which wavelength to switch during switching.

Figure 5:
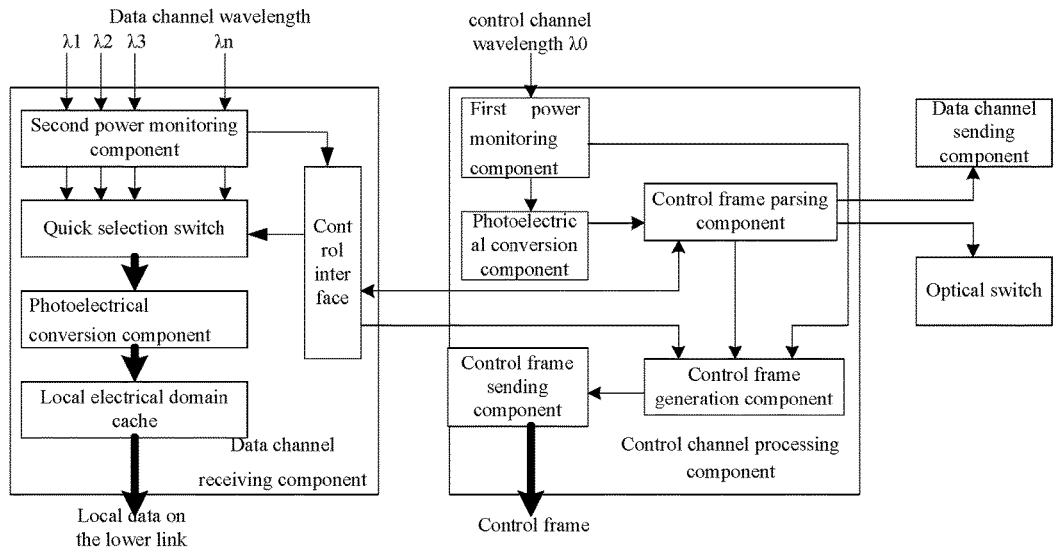
FIG. 5 is a diagram showing an internal logical structure of a slave node in an OBRing according to an embodiment the disclosure.

Specifically, the internal logical structure of each node is as shown in FIG. 5, including a control channel processing component, a data channel receiving component, a data channel sending component and a protection switch, in which, the control channel processing component includes:

a first power monitoring component, which is configured to detect the optical signal power state of the control channel and to output a control frame to a control frame parsing component after performing photoelectrical conversion; normally, the control signal always has a stable optical power and may enter the control frame parsing component after one photoelectrical conversion; if the monitoring result shows optical loss (it is indicated that there is a fault on the control channel transceiver of the upstream node or there is a break fibre between the upstream node and the current node), the first power monitoring component immediately reports this condition to the control frame generation component;

a control frame parsing component, which is configured to: parse the control frame, transmit corresponding instructions to the data channel receiving component and the data channel sending component respectively according to the bandwidth reservation information indicated in the control frame, transmit data frame on the upper or lower link normally; since the control frame needs to be forwarded downstream, after the control frame is parsed, part control information of the control frame continues to enter the control frame generation component to generate a new control frame; if the control frame received by the node indicates the node to perform a protection switching operation, the control frame parsing component notifies the protection switch to perform a switching action after finishing parsing the control frame;

a control frame generation component, which is configured to: receive the information from the control frame parsing component or a fault notification from the data channel receiving component, generate a new control frame according to the notification, for example, filling a corresponding fault feature in the corresponding field of the control frame, and send the new control frame to a control frame sending component;

a control frame sending component, which is configured to send the new control frame sent from the control frame generation component to a fibre line to transmit to a downstream node, wherein the control frame sending component physically is a control channel transmitter;

an optical switch, which is configured to receive an action notification from the control frame parsing component and to perform a switching operation.

The data channel receiving component includes:

a second power monitoring component, which is configured to monitor each wavelength; as long as optical power loss is monitored on one or some or all wavelengths, it is indicated that there probably is a fault at the upstream node or a link fault, and the fault information will be notified to the control frame generation component via a control interface;

a quick selection switch, which is configured to receive, via the control interface, the control frame sent from the control channel processing component, and to receive, according to the bandwidth reservation information contained in the control frame, an OB optical signal that should be transmitted on the lower link, wherein the received OB optical signal is received by subsequent other upper layer components and is finally sent to a user end after photoelectrical conversion and local electrical domain cache. Local electrical domain cache is implemented by an existing component and no further description is needed here;

the data channel sending component which is configured to add local service data in the OB form according to the bandwidth allocation information carried in the control frame.

Figure 6:
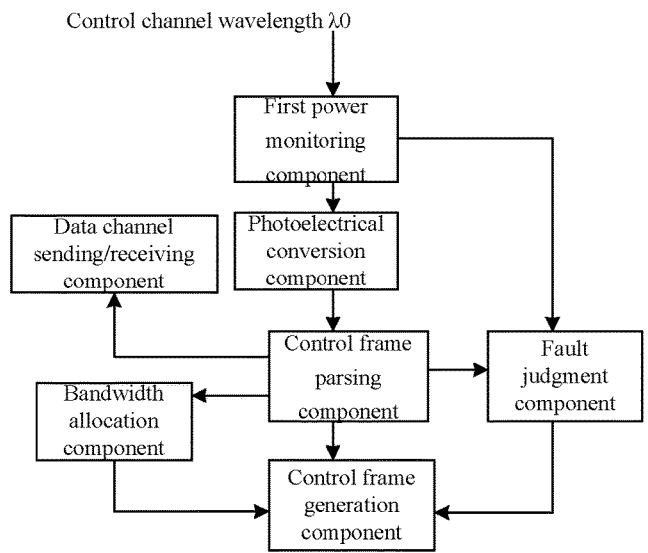
FIG. 6 is a diagram showing an internal logical structure of a master node in an OBRing according to the disclosure.

Particularly, FIG. 6 is a diagram of an internal logical structure of a master node in an OBRing according to an embodiment of the disclosure. As shown in FIG. 6, the master node, which holds responsibility for global control and scheduling, further includes a fault judgment component and a bandwidth allocation component besides the function component shown in FIG. 5, the fault judgement component is configured to: collect monitoring results on the master node, acquire the optical power monitoring results of other nodes in this network from the information parsed by the control frame parsing component, determine, according to the monitoring results, whether there is a fault in the network, determine the fault type and the fault location, and output the obtained fault result to the control frame generation component;

the control frame generation component, besides having the function shown in FIG. 5, is further configured to: receive a bandwidth allocation result from the bandwidth allocation component and convert the bandwidth allocation result into corresponding control frame data, receive a fault result from the fault judgement component, generate corresponding signalling information according to the fault result and filling the signalling information into a control frame, and send the new control frame to the control frame sending component. For a protection switching operation, generating corresponding signalling information, which includes a switching instruction, a ranging instruction and a system restart instruction, according to the fault result.

Specification embodiments are provided below to further describe the method in the disclosure in view of common node and master node.

Each common node performs real-time optical power monitoring using an optical power monitoring component. No matter the control channel or the data channel is detected of optical loss, it might be considered that a fault is discovered. Theoretically, if to consider the single-point fault only, the power monitoring result of one node might include the following conditions:

the control channel and the data channel on both rings can be detected of optical power (or a particular wavelength of the data channel is detected of no optical power) or, on one ring the control channel is detected of no optical power while the data channel is detected of optical power (or a particular wavelength is detected of no optical power), but on the other ring both channels can be detected of optical power; or, neither the control channel nor the data channel can be detected of optical power on one ring.

According to the monitoring result above, take the first condition, that is, the control channel and the data channel on both rings can be detected of optical power (or a particular wavelength of the data channel is detected of no optical power), for example, that is to say, there probably is a fault on the transmitter of a particular data channel wavelength of the upstream node, which only affects the data channel of one node, but does not affect the normal operation of the control channel and other network nodes. At this time, this node only needs to fill corresponding monitoring information into a control frame.

According to the monitoring result above, take the second condition, that is, on one ring the control channel is detected of no optical power while the data channel is detected of optical power (or a particular wavelength is detected of no optical power), but on the other ring both channels can be detected of optical power, for example, that is to say, there is a fault on the control channel of the upstream node, at this time, the node monitored of this fault cannot receive a control frame sent from an upstream node, and shall package a new control frame immediately and fill the fault result into the corresponding field, and transmit the control frame to the master node through the ring connected with the master node.

According to the above monitoring results, take the third condition, that is, neither the control channel nor the data channel can be detected of optical power on one ring, for example, that is to say, there is fibre break on the fibre line on one side of the node, maybe dual-fibre break or single-fibre break; the node monitored of this fault shall package a new control frame immediately and mark the fault result, and transmit the control frame to the master node through the ring connected with the master node.

Further, based on the above node fault monitoring results, in the above three conditions, after the common node transmits the fault result information to the master node through the control channel, the master node performs a comprehensive judgment according to the information sent from all nodes, and decides to whether to send a control frame containing a specific switching instruction.

Specifically, take FIG. 3 for example, when dual-fibre break occurs between node 3 and node 4, the third condition of the above fault conditions is detected on the node 3, for example, both the control channel and the data channel on the outer ring are detected of no optical power, while the inner ring still can be detected of optical power; the third condition of the above fault conditions is detected on the node 4 too, specifically, both the control channel and the data channel on the inner ring are detected of no optical power, while the outer ring still can be detected of optical power.

At this time, node 3 and node 4 immediately send respective monitored fault result to the master node 1. Specifically, the node 3 acquires synchronization clock through the control channel connected with the master node on the inner ring, the control frame is sent to the master node 1 through the control channel of the outer ring; while the condition on the node 4 is just opposite, that is, the node 4 acquires the synchronization clock of the master node through the control channel on the outer ring and sends the fault result to the master node 1 through the control channel of the inner ring.

After receiving the fault result information from the node 3 and the node 4 simultaneously in one ring period, the master node 1 generates a control frame indicating a switching operation after the judgement of the fault judgment component and transmits the control frame through the control channels in two ring directions respectively.

When receiving the control frame containing the switching operation from the master node 1, the slave nodes on the ring first judge whether themselves are the nodes at two ends of the fault point; if not, the slave node directly enters a protection state and waits the master node to reallocate bandwidth; otherwise, the slave node performs a corresponding optical switch switching operation according to the switching instruction; as shown in FIG. 3, node 3 and node 4 are fault end nodes and they will perform switching by their optical switches, while node 1 and node 2 are not fault end nodes and will directly enter a protection state.

Further, after the above switching operation is finished and the node enters the protection working state, each slave node might send a control frame indicating a successful operation to the master node 1, which then restarts network ranging after confirming that all nodes are ready.

Further after ranging is finished, the master node 1 sends a normal bandwidth allocation control frame, so that each node in the network performs normal OB transceiving under the uniform scheduling of the control channel.

Further, in the network in the protection state, after the fault is eliminated and the network management system transmits a recovery instruction, the master node 1 transmits a control frame containing a recovery instruction through the control channel. The common node receiving the control frame containing the recovery instruction enters to the normal working state from the protection state, and waits the master node to restart a new bandwidth allocation.

The fault result information collected by the master node are periodically checked by the fault judgement component. If the fault judgement component judges that the fault is a fault needing a switching operation (including single-fibre/dual-fibre single-point break, control channel fault, node paralysis and the like), the master node generates a control frame and carries a switching instruction in the control frame. While determining the fault, the master node also needs to further determine the fault location. There are many ways to determine the fault location and no limitation is made here, for example, according to the ID of the node reporting the fault on one ring, if starting from the node with ID which is n, the downstream nodes all report fault information, it can be determined that the node n is a downstream node adjacent to the fault point; similarly on the other ring. In this way, two fault end nodes may be determined according to the judgement on two rings. If at this time the master node just is at one end of the fault point, the master node itself will performs a switching operation, and switches the optical switch to enter a protection state; otherwise, the master node directly enters the protection state. Further, the master node optionally waits all nodes to return a control frame indicating successful switching, or, in order to save signalling time, defaults all nodes to enter the protection state, and performs network ranging. After ranging is finished, the master node starts to send a bandwidth allocation control frame and performs normal OB transceiving, until the fault is eliminated and the network management system transmits a recovery instruction; then, the master node sends a control frame containing a recovery instruction to all nodes in the network, so that the network exits the protection working state and restarts the normal dual-ring working state.

The above are the preferred embodiments of the disclosure only and are not intended to limit the scope of protection of the disclosure. Any modification, equivalent substitute and improvement made within the spirit and principle of the disclosure are intended to be included in the scope of protection of the disclosure.

What is claimed is:

1. A method for implementing Automatic Protection Switching (APS) in an Optical Burst-switching Ring (OBRing) network, comprising: performing separately, by a master node and one and more slave nodes, optical power monitoring on respective channels, and aggregating monitoring results to the master node;
   when determining, according to the monitoring results, that a fault occurs, sending, by the master node, a switching operation instruction to each slave node of the one or more slave nodes; and
   performing a switching operation and entering a protection working state, by the each slave node;
   wherein based on that the master node is located at one end of a fault point, the method further comprises: performing a switching operation by the master node itself, and triggering, by the master node, a protection switch to enter a protection state; otherwise, directly entering the protection working state by the master node;
   wherein before the slave node performs the switching operation, the method further comprises: after the slave node receives a switching operation instruction, judging, by the slave node, whether the slave node is one of the nodes located at two ends of the fault point; based on that the slave node is not one of the nodes located at two ends of the fault point, the slave node directly entering the protection working state and waiting the master node to reallocate bandwidth; based on that the slave node is one of the nodes located at two ends of the fault node, entering the protection working state according to the switching operation instruction after performing a switching operation on the protection.

2. The method according to claim 1, wherein the optical power monitoring comprises real-time monitoring of optical power states of a control channel and a data channel.

3. The method according to claim 2, wherein aggregating the monitoring results to the master node comprises:
   transmitting, by the each slave node, the monitoring result carried in a control frame or a new fault report message to the master node through the control channel;
   the monitoring result of the master node comprises a real-time monitoring result that the master node monitors the optical power states of the control channel and the data channel and the monitoring result reported by the each slave node through the control channel.

4. The method according to claim 2, wherein the determining, according to the monitoring results, that the fault occurs comprises:
   when the monitoring results show that there is only one ring having a node reporting optical loss on both control channel and data channel, determining that the fault is a single-fibre single-point line fault;
   when the monitoring results show that there are two rings respectively having a node, which is adjacent to each other, reporting optical loss on both control channel and data channel, determining that the fault is a double-fibre single-point line fault;
   when the monitoring results show that there is only one node reporting optical loss on the control channel, determining that the fault is a control channel transmitter fault;
   when the monitoring results show that both rings have an exception in receiving of control frames, determining that the fault is a non-master node paralysis.

5. The method according to claim 4, wherein when the fault indicates that there is a wavelength fault in a data channel which does not affect an operation of an entire network, the method further comprises:
   notifying, by the master node, related nodes to avoid the data channel with an unavailable wavelength, and reporting, by the master node, a condition to a network management system.

6. The method according to claim 3, further comprising: feeding back, by the each slave node, a control frame indicating a successful switching operation to the master node;
   or, feeding back a fault report response message indicating a successful switching operation corresponding to the fault report message.

7. The method according to claim 1, wherein performing the switching operation on the protection switch to enter the protection working state comprises: switching the protection switch from a bar state which is a normal working state to a cross state; or,
   scheduling the control channel from one ring to another ring in an electrical domain.

8. The method according to claim 1, wherein after entering the protection working state, the method further comprises: sharing one control channel, by all transceivers of the master node and each slave node;
   dividing each node into an upper node and a lower node logically, which correspond to transceivers on the original inner ring and outer ring respectively, wherein the upper node extracts from a control frame the bandwidth configuration information of an upper link and performs Optical Burst-switching (OB) transceiving according to the bandwidth configuration information of the upper link, and the lower node extracts, from a control frame, bandwidth configuration information of a lower link and performs OB transceiving according to the bandwidth configuration information of the lower link.

9. The method according to claim 8, wherein the master node is divided into an upper master node and a lower master node logically and the method further comprises:
   when the control frame flows through the upper master node, all bandwidth request information of the lower link is aggregated to the upper master node, and the upper master node calculates a corresponding bandwidth configuration policy according to a bandwidth allocation algorithm and fills the corresponding bandwidth configuration policy into a control frame; when the control frame flows through a first node on the lower link, the carried bandwidth allocation policy of the lower link begin to take effect;

correspondingly, when the control frame flows through the lower master node, all bandwidth requests of the upper node are submitted and a corresponding bandwidth allocation policy of the upper link is updated according to the bandwidth allocation algorithm.

10. The method according to claim 1, further comprising: ranging by the master node, and fine tuning, by the master node, a ring length according to a ranging result.

11. The method according to claim 10, further comprising: recovering normal transmission of services on the master node and each slave node.

12. The method according to claim 11, wherein after the fault is recovered, the method further comprises: transmitting, by the network, an instruction through the network management system to notify the master node and the each slave node to enter a normal dual-ring working state from the protection working state.

13. The method according to claim 12, wherein entering to the normal dual-ring working state comprises:

after the master node receives the instruction from the network management system, sending, by the master node, a control frame carrying a network recovery indication on the control channel, wherein the control frame is processed and forwarded at all approached nodes;

suspending all services and waiting a new restart by the approached nodes, meanwhile, when the nodes at two ends of the fault section terminates service transmission, switching back the protection switch from the cross state to the bar state which is the normal working state, or, stopping the cross-ring forwarding of the control channel in an electrical domain, and recovering to the normal working state.

14. The method according to claim 13, wherein after the master node sends the control frame carrying the network recovery indication, the method further comprises: enabling a new turn of ranging, bandwidth allocation and restart by the master node immediately or after receiving a response indicating waiting from the each slave node.

* * * * *